United States Patent [19]

Joglekar et al.

[11] Patent Number: 5,117,450
[45] Date of Patent: May 26, 1992

[54] CELLULAR TELEPHONE WITH STANDARD TELEPHONE SET

[75] Inventors: Manohar A. Joglekar, Elk Grove Village; Philip F. Aseltine, Arlington Heights, both of Ill.

[73] Assignee: Motorola, Inc., Schaumburg, Ill.

[21] Appl. No.: 622,201

[22] Filed: Nov. 27, 1990

Related U.S. Application Data

[63] Continuation of Ser. No. 369,419, Jun. 20, 1989, abandoned, which is a continuation-in-part of Ser. No. 349,619, May 10, 1989, abandoned.

[51] Int. Cl.⁵ .............................................. H01Q 7/04
[52] U.S. Cl. .................................... 379/58; 379/59
[58] Field of Search ............................ 379/58, 59, 60

[56] References Cited

U.S. PATENT DOCUMENTS

| | | | |
|---|---|---|---|
| 4,122,304 | 10/1978 | Mallien, II | 179/2 EB |
| 4,658,096 | 4/1987 | West, Jr. et al. | 379/59 |
| 4,718,080 | 1/1988 | Serrano et al. | 379/59 |
| 4,737,475 | 4/1988 | Shafer | 379/58 |
| 4,775,997 | 10/1988 | West, Jr. et al. | 379/58 |

OTHER PUBLICATIONS

Celjack Owners Manual-by Telular Inc.
The Description and Specification GNTA Payphone Type AY4 (NMT) for "Connection to a Mobile Radiostation in Accordance with the Specification for the Nordic Mobile Telephone Systems (NMT)" by GNT Automatic A/S.
Instruction Manual No. 1S-SP134682 describes an IMTS subscriber.
Instruction Manual No. 68P81071E30—The Cellular Connection.

*Primary Examiner*—James L. Dwyer
*Assistant Examiner*—M. Shehata
*Attorney, Agent, or Firm*—Rolland R. Hackbart

[57] ABSTRACT

A unique cellular telephone (100) connects to a standard telephone set (101) for providing cellular telephone services to subscribers in remote locations not served by a landline telephone system. Cellular telephone (100) includes a cellular telephone transceiver (109), microcomputer (108) and circuitry (102-106) for interfacing the cellular telephone transceiver (109) to the telephone set (101). The interface circuit (102-107) provides the audio, voltage and dial signal interface to the telephone set (101). The microcomputer (108) controls the interface circuitry (102-106) and is responsive to the telephone set (101) for answering and placing cellular telephone calls.

10 Claims, 2 Drawing Sheets

CELLULAR TELEPHONE WITH STANDARD TELEPHONE SET

RELATED APPLICATIONS

This is a continuation of application Ser. No. 07/369,419, filed Jun. 20, 1989 and now abandoned, which in turn is a continuation-in-part of application Ser. No. 07/349,619 filed May 10, 1989 and now abandoned.

BACKGROUND OF THE INVENTION

The present invention is generally related to radiotelephones, and more particularly to a cellular telephone with a standard telephone set.

Cellular telephones currently are operated with a special purpose handset that is coupled via audio and data buses to a cellular telephone transceiver. In order to avoid use of a cellular radio channel during dialing and minimize costs of cellular telephone calls, cellular telephone users are required to dial a telephone number and then press a "SEND" button (pre-origination dialing), in order to place a cellular telephone call. Pressing the "SEND" button causes the cellular telephone handset to generate a "SEND" signal and append it to the dialed digits transmitted to the cellular telephone transceiver.

When a conventional pulse or tone dial telephone set or equivalent machine, such as a modem, is used in association with a cellular telephone, there is a need for either a "SEND" button or circuitry that simulates the "SEND" function. A "SEND" button can be added to a conventional telephone set by using a # or * button or hookswitch flash, both requiring additional circuitry and/or software in an interface device.

A "SEND" button can also be simulated by detecting the end of dialing and automatically generating the "SEND" signal in the same manner as is done by the cellular telephone handset. Detecting the end of dialing and automatically generate the "SEND" signal is described in U.S. Pat. Nos. 4,658,096, 4,737,975 and 4,775,997. According to these patents, an interface device detects the end of dialing and automatically appends a "SEND" signal to the dialed digits sent to the cellular telephone transceiver. However, in order to detect the end of dialing, such interface device requires additional circuitry to determine how many digits the dialed telephone has and then count the number of dialed digits actually received. Thus, adding a "SEND" button or circuitry that simulates the "SEND" function as in the prior art described above requires additional circuitry and increases the cost and complexity of the cellular telephone. For the foregoing reasons, there is a need for a cellular telephone which does not require generation of the "SEND" signal.

OBJECTS OF THE INVENTION

Accordingly, it is an object of the present invention to provide a unique cellular telephone for use with a standard telephone set or equivalent device, which automatically places and receives cellular telephone calls.

It is another object of the present invention to provide a unique cellular telephone which processes digits of a telephone number dialed in any pattern on a standard telephone set or equivalent device.

DETAILED DESCRIPTION OF THE PREFERRED EMBODIMENT

Figure 1:
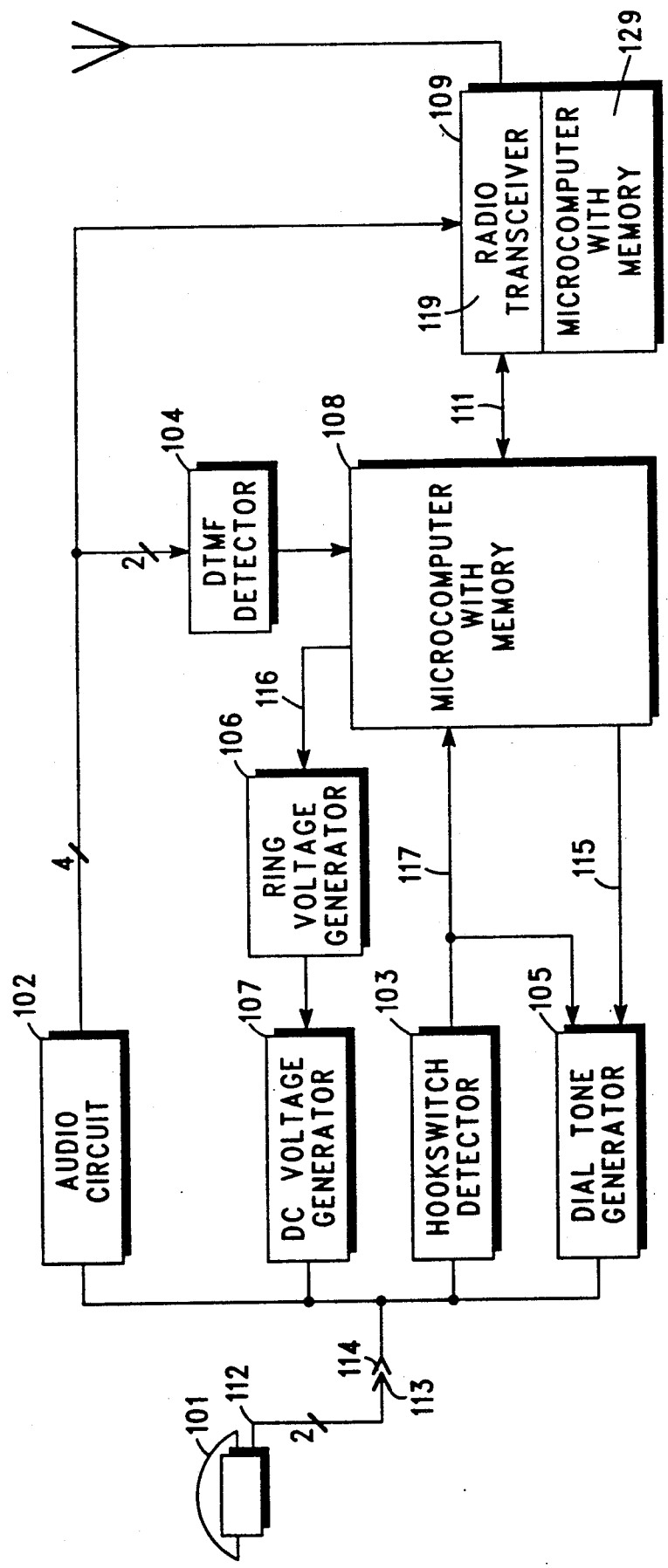
FIG. 1 is a block diagram of a cellular telephone 100 embodying the present invention, into which a standard telephone instrument 101 may be plugged.

Referring to FIG. 1, there is illustrated a block diagram of a cellular telephone 100 embodying the present invention, into which a standard telephone set 101 may be plugged. Cellular telephone 100 may be advantageously utilized in remote locations for providing cellular telephone services to subscribers who can not obtain conventional landline telephone service. Telephone set 101 may be a conventional telephone instrument or equivalent device having either a pulse or tone dial. For example, telephone set 101 may be a desk set, wall set, modem, or a separate dial, ringer and handset of the type found in a phone booth. Telephone set 101 requires approximately twenty milliamps of operating current provided by cellular telephone 100 via two wires 112 typically referred to as "tip" and "ring" wires. Telephone set 101 also typically includes a modular RJ11C plug 113 which couple to corresponding modular RJ11C receptacle 114 in cellular telephone 100.

Cellular telephone 100 includes a cellular telephone transceiver 109 with a radio transceiver 119 and microcomputer 129 with memory therein for controlling the operation thereof. Cellular telephone transceiver 109 may be any conventional cellular telephone transceiver having a radio transmitter, radio receiver and logic unit, such as, for example, the transceiver shown and described in Motorola instruction manual number 68P81066E40, entitled "DYNATAC Cellular Mobile Telephone 800 MHZ Transceiver," published by and available from Motorola C & E Parts, 1313 East Algonquin Road, Schaumburg, Ill. 60196.

Cellular telephone 100 also includes blocks 102-106 for interfacing cellular telephone tranceiver 109 to telephone set 101. Blocks 102-107 provide the audio, voltage and dial signal interface circuitry to telephone set 101 and may be conventional circuits of the type shown and described in Motorola instruction manual number 68P81071E30, entitled "THE CELLULAR CONNECTION Cellular Mobile Telephone Intelligent RJ11C Interface," published by and available from Motorola C & E Parts, 1313 East Algonquin Road, Schaumburg, Ill. 60196.

Voltage generator 107 generates a 48 V DC voltage which is coupled to wires 112 for supplying approximately twenty milliamps of current to operate telephone set 101. Ring voltage generator 106 produces a ringing signal having a high voltage at a rate commonly used in telephone systems and being coupled via voltage generator 107 to telephone set 101. The rate of the ringing signal produced by ring voltage generator 106 is controlled by microcomputer 108 via control signal 116.

Audio circuit 102 is an electronic bridge circuitry which converts the two-wire balanced audio from telephone set 101 to four-wire unbalanced audio i.e., transmit and receive audio needed in a duplex telephone system. The four-wire unbalanced audio from audio circuit 102 is coupled to the radio receiver and radio transmitter of radio transceiver 119. The transmit audio from audio circuit 102 is also coupled to DTMF detector 104.

Hookswitch detector 103 detects the transition of telephone set 101 from "on hook" to "off hook" or vice versa and produces a hookswitch signal 117 having a binary zero state when telephone set 101 is on hook and a binary one state when telephone set 101 is off hook. During pulse dialing, the hookswitch signal 117 from detector 103 transitions from the binary one state to the binary zero state for each dial pulse. Hookswitch signal 117 from detector 103 is coupled to microcomputer 108 and dial tone generator 105. Microcomputer 108 monitors the hookswitch signal 117 from detector 103 to determine when telephone set 101 is off or on hook and to detect the digits of a pulse dialed telephone number.

Dial tone generator 105 is responsive to control signal 115 from microcomputer 108 and the hookswitch signal 117 from detector 103 for generating dial tone when telephone set 101 comes off hook. Dial tone is generated when the hookswitch signal 117 from detector 103 and control signal 115 from microcomputer 108 change to a binary one state. Upon detection of dialing, control signal 115 from microcomputer 108 changes from a binary one state to a binary zero state to shut off dial tone generator 105. In other embodiments, dial tone may be internally generated in microcomputer 108 and coupled to audio circuit 102 for application to telephone set 101.

DTMF detector 104 is coupled to the transmit audio from audio circuit 102 for detecting tone dialed digits of a dialed telephone number. Detector 104 may be a commercially available detector which translates dual-tone multi-frequency (DTMF) tones into a four-bit binary equivalent which is coupled to microcomputer 108 for processing. To select between tone or pulse dialed digits, an input signal to microcomputer 108 may be coupled to a binary zero or binary one by a jumper wire or a user-programmable switch depending on the type of telephone set 101 coupled to cellular telephone 100.

Microcomputer 108 with memory therein controls blocks 105 and 106 and is responsive to hookswitch signal 117 and digits dialed from telephone set 101 for answering and placing cellular telephone calls. On receipt of an incoming call, microcomputer 108 enables ring voltage generator 106 for ringing telephone set 101. If a call is initiated by telephone set 101 coming off hook, microcomputer 108 decodes the following pulse or tone dialed digits and, according to the present invention, forwards each digit on a real time basis to the microcomputer 129 of cellular telephone transceiver 109. Each dialed digit is stored by microcomputer 129. When microcomputer 129 detects the absence of dialed digits for a predetermined time, a cellular telephone phone call is automatically placed. Thus, by utilizing the present invention, there is no need to detect a specific number of digits (e.g. seven digits in local numbers and ten digits in long distance numbers) and no need to generate a "SEND" signal as was done in the prior art. As a result, cellular telephone 100 accommodates any dialing pattern regardless of the number of digits of the telephone number.

In the preferred embodiment, microcomputer 108 is coupled to microcomputer 129 of cellular telephone transceiver 109 by way of a three-wire data bus 111, which is illustrated and described in U.S. Pat. No. 4,369,516. Microcomputer 108 is essentially continuously looking for dialed digits and forwarding each digit on a real time basis to microcomputer 129. Each digit detected by microcomputer 108 is coded into a message and transmitted via bus 111 to microcomputer 129. Microcomputer 129 receives each dialed digit from bus 111 and stores the received digits in a pre-selected location of its memory. If another digit is not received in a predetermined time (five seconds in the preferred embodiment), the digits stored in the pre-selected memory location of microcomputer 129 are transmitted via the cellular radio channels by the radio transmitter of radio transceiver 119 for initiating a cellular telephone call.

Figure 2:
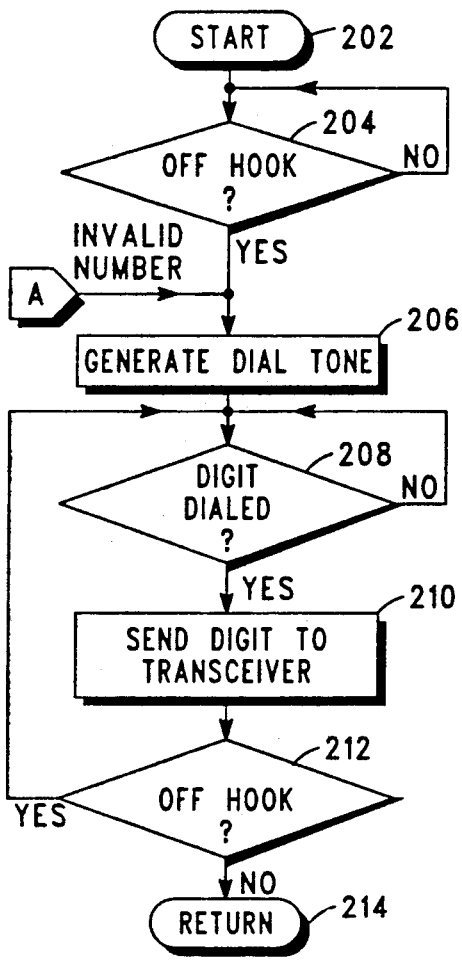
FIG. 2 is a flow chart for the process used by microcomputer 108 in FIG. 1 for processing dialed digits of a telephone number.

Referring next to FIG. 2, there is illustrated a flow chart for the process used by microcomputer 108 in FIG. 1 for processing dialed digits of a telephone number. Entering at START block 202, the process proceeds to decision block 204, where a check of the hookswitch signal 117 is made to determine if telephone set 101 is off hook. If not, NO branch is taken to wait. If telephone set 101 is off hook, YES branch is taken from decision block 204 to block 206, where microcomputer 108 generates a binary one state of control signal 115 to generate dial tone. Block 206 may also be reached via a branch A if an invalid telephone number has been dialed, as explained hereinbelow with respect to FIG. 4. Next, at block 208, a check is made to determine if a digit has been dialed. If not, NO branch is taken to wait. If a digit has been dialed, YES branch is taken from decision block 208 to block 210 where a binary zero state of control signal 115 is generated and the dialed digit is coded into a message and sent via bus 111 to microcomputer 129. Next, at decision block 212, a check of the hookswitch signal 117 is made to determine if telephone set 101 is still off hook. If so, YES branch is taken back to decision block 208 to repeat the foregoing process. If telephone set 101 is not off hook, NO branch is taken from decision block 212 to block 214 to return to other tasks.

Figure 3:
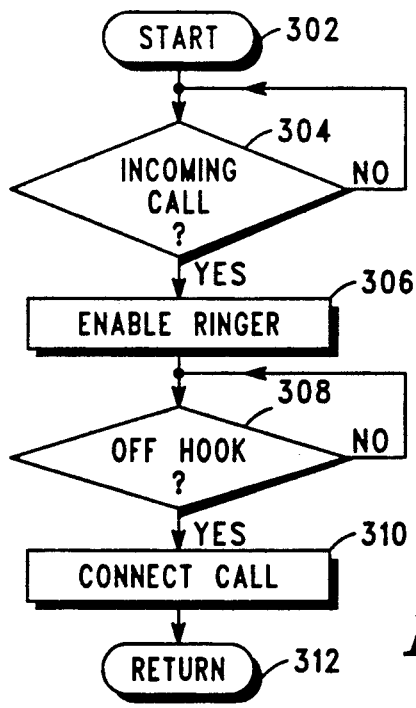
FIG. 3 is a flow chart for the process used by microcomputer 108 in FIG. 1 for processing incoming telephone calls.

Referring next to FIG. 3, there is illustrated a flow chart for the process used by microcomputer 108 in FIG. 1 for processing incoming telephone calls. Entering at START block 302, the process proceeds to decision block 304, where a check is made to determine if an incoming call has been received. If not, NO branch is taken to wait. If an incoming call has been received, YES branch is taken from decision block 304 to block 306, where microcomputer 108 generates a binary one state of control signal 116 to generate the ringing signal. Next, at decision block 308, a check of the hookswitch signal 117 is made to determine if telephone set 101 is off hook. If not, NO branch is taken to wait. If telephone set 101 is off hook, YES branch is taken from decision block 308 to block 310 to generate a binary zero state of control signal 116, connect the call and thereafter return to other tasks at block 312.

Figure 4:
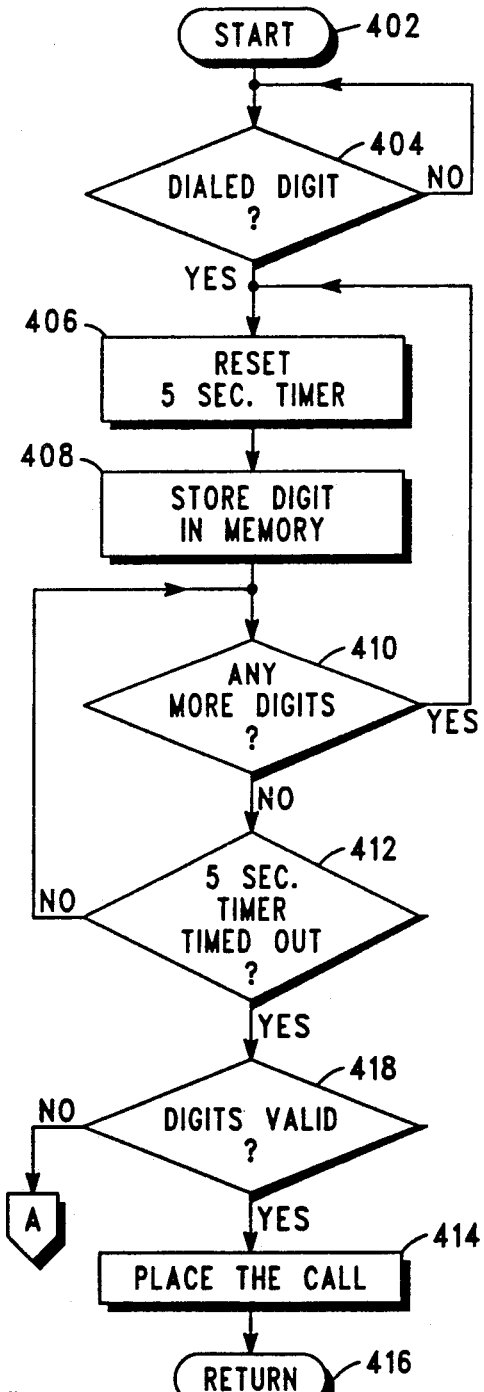
FIG. 4 is a flow chart for the process used by microcomputer 129 in cellular telephone transceiver 109 in FIG. 1 for receiving dialed digits of a telephone number and placing a telephone call to the dialed telephone number.

Referring next to FIG. 4, there is illustrated a flow chart for the process used by microcomputer 129 in cellular telephone transceiver 109 in FIG. 1 for receiving dialed digits of a telephone number and placing a cellular telephone call to the dialed telephone number.

Entering at START block 402, the process proceeds to decision block 404, where a check is made to determine if a dialed digit has been received in a message via bus 111 from microcomputer 108. If not, NO branch is taken to wait. If a dialed digit has been received, YES branch is taken from decision block 404 to block 406, where a five-second timer is reset and started. In the preferred embodiment, a five second timer implemented by interrupt based software is used to measure time elapsed since the last dialed digit was received. In other embodiments, such timer may be implemented by separate timing circuitry and may have a value which depends on operating characteristics of telephone set 101. Next, at block 408, the received digit is stored in a pre-selected location of the memory of microcomputer 129. Then, at decision block 410, a check is made to determine if another dialed digit has been received. If so, YES branch is taken from decision block 410 back to block 406 to repeat the foregoing process. If another dialed digit has not been received, NO branch is taken from decision block 410 to decision block 412, where a check is made to determine if the five-second timer has timed out. If not, NO branch is taken back to decision block 410 to check for receipt of the next dialed digit, if any. If the five-second timer has timed out, YES branch is taken from decision block 412 to decision block 418, where the dialed digits are checked to determine if a valid telephone number has been dialed. For example, the dialed digits are checked to determine if seven digits are present for local numbers, ten digits are present for long distance numbers preceded by a one or zero, three digits are present for 411 information, 611 telephone repair and 911 emergency, and other digit sequences depending on the country and telephone system in which cellular telephone is being used. If the dialed digits are not valid, NO branch is taken from decision block 418 to branch A to return to the flow chart of FIG. 2 and generate dial tone again. Thus, according to a feature of the present invention, dial tone is returned to the user of cellular telephone if an invalid telephone number is dialed. If the dialed digits are valid, YES branch is taken from decision block 418 to block 414 where a cellular telephone call is placed to the number comprised of the digits stored in the pre-selected memory location of microcomputer 129, and thereafter return to other tasks at block 416.

In summary, a unique cellular telephone automatically places and receives cellular telephone calls dialed in any pattern on a standard pulse or tone dial telephone set or equivalent device. The dialed digits of a telephone number are processed by the unique cellular telephone of the present invention on a real-time basis resulting in automatic placement of a cellular telephone call without using a "SEND" button or circuitry that simulates the "SEND" function as in the prior art.

We claim:

1. Cellular telephone apparatus, comprising:
a telephone device having dialing means for dialing digits of telephone numbers, producing a hookswitch signal indicating an off-hook condition and the dialed digits, and having first plug means coupled to the hookswitch signal; and
a cellular telephone including:
second plug means for coupling to the first plug means of the telephone device;
cellular transceiver means including second microcomputer means and memory means, and being operable on cellular radio channels for communicating cellular telephone calls;
data bus means having first and second ports, the second port being coupled to said cellular transceiver means;
first microcomputer means coupled to the second plug means for detecting the off-hook condition of the hookswitch signal and thereafter receiving each dialed digit, and said first microcomputer means coupled to the first port of said data bus means for automatically transmitting each received digit immediately after receipt to the cellular transceiver means; and
said second microcomputer means being coupled to the second port of said data bus means for storing each transmitted digit in said memory means, automatically validating all of the stored digits when the elapsed time from receipt of the last stored digit exceeds a predetermined time interval, and automatically transmitting all of the stored digits on one of the cellular radio channels when the stored digits have been validated, whereby all dialed digits of each telephone number are automatically validated and transmitted when dialing is interrupted for at least the predetermined time interval.

2. The cellular telephone apparatus according to claim 1, wherein said cellular telephone further includes means coupled to the second plug means and first microcomputer means for generating a ringing signal for ringing the telephone device.

3. The cellular telephone apparatus according to claim 1, wherein said cellular telephone further includes means coupled to the second plug means and first microcomputer means for generating a dial tone signal.

4. The cellular telephone apparatus according to claim 1, wherein said cellular telephone means further includes means coupled to the second plug means for generating a DC voltage for powering the telephone device.

5. The cellular telephone apparatus according to claim 1, wherein said cellular telephone means further includes means coupled to the second plug means and cellular transceiver means for coupling audio signals therebetween.

6. Cellular telephone apparatus, comprising:
a telephone device having dialing means for dialing digits of telephone numbers, producing a hookswitch signal indicating an off-hook condition and the dialed digits, and having first plug means coupled to the hookswitch signal; and
a cellular telephone including:
second plug means for coupling to the first plug means of the telephone device;
cellular transceiver means including second microcomputer means and memory means, and being operable on cellular radio channels for communicating cellular telephone calls;
data bus means having first and second ports, the second port being coupled to said cellular transceiver means;
first microcomputer means coupled to the second plug means for detecting the off-hook condition of the hookswitch signal and thereafter receiving each dialed digit, and said first microcomputer means coupled to the first port of said data bus means for automatically transmitting each received digit immediately after receipt to the cellular transceiver means; and said second microcomputer means being coupled to the second port of said data bus means for storing each transmitted digit in said memory means, and automatically transmitting all of the stored digits on one of the cellular radio channels when the elapsed time from receipt of the last stored digit exceeds a predetermined time interval, whereby all dialed digits of each telephone number are automatically transmitted when dialing is interrupted for at least the predetermined time interval.

7. The cellular telephone apparatus according to claim 6, wherein said cellular telephone further includes means coupled to the second plug means and first microcomputer means for generating a ringing signal for ringing the telephone device.

8. The cellular telephone apparatus according to claim 6, wherein said cellular telephone further includes means coupled to the second plug means and first microcomputer means for generating a dial tone signal.

9. The cellular telephone apparatus according to claim 6, wherein said cellular telephone further includes means coupled to the second plug means for generating a DC voltage for powering the telephone device.

10. The cellular telephone apparatus according to claim 6, wherein said cellular telephone further includes means coupled to the second plug means and cellular transceiver means for coupling audio signals therebetween.

* * * * *